United States Patent [19]

Inovius

[11] Patent Number: 5,041,268
[45] Date of Patent: Aug. 20, 1991

[54] REACTOR FOR REDUCING THE CONTENTS OF NITROGEN OXIDES AND SULPHUR OXIDES IN COMBUSTION GASES

[76] Inventor: Allan Inovius, Le Continental Bloc A, Plaze des Moulins, Monte Carlo, Monaco

[21] Appl. No.: 476,459
[22] PCT Filed: Dec. 9, 1988
[86] PCT No.: PCT/SE88/00670
§ 371 Date: Aug. 7, 1990
§ 102(e) Date: Aug. 7, 1990
[87] PCT Pub. No.: WO89/05422
PCT Pub. Date: Jun. 15, 1989

[30] Foreign Application Priority Data

Dec. 11, 1987 [SE] Sweden ............................ 8704987

[51] Int. Cl.⁵ .................. B01D 53/34; B01D 53/36; F23D 5/00; F23D 9/00
[52] U.S. Cl. .................................. 422/182; 422/183; 110/214
[58] Field of Search ................. 422/182, 183; 110/214

[56] References Cited

U.S. PATENT DOCUMENTS 4,262,609  4/1981  Inovius ........................ 431/158 X
4,363,785 12/1982  Willson ........................ 110/214 X
4,481,889 11/1984  Sikander et al. .................. 110/212
4,762,074  8/1988  Sorensen ...................... 110/205 X
4,830,833  5/1989  Shaff .......................... 422/182 X Primary Examiner—Robert J. Warden
Assistant Examiner—Stephanie Blythe
Attorney, Agent, or Firm—Cushman, Darby & Cushman

[57] ABSTRACT

A reactor for reducing the contents of nitrogen oxides and sulphur oxides in combustion gases. The reactor is in the form of a post-combustion chamber to be connected after a combustion chamber. The reactor has a casing including a generally cylindrical main part transforming at its top into a dome-shaped outlet part with an outlet opening. Around the casing of the reactor, there is provided a heat-insulated wall whose inner side has substantially the same shape as the casing and which is eccentrically disposed in relation to the casing. The casing of the reactor accommodates a partition which is conical and has its apex directed towards the outlet opening. A gap is formed between the shell and the partition. At the inlet end of the shell, an inlet funnel is provided at a certain distance from the inlet end as so to form a gap. A heat exchanger is provided for preheating secondary air supplied through a secondary air intake into the gap between the casing and the wall at a certain distance from the opening. At the bottom, the gap is connected to a collecting box and an outlet pipe.

5 Claims, 4 Drawing Sheets

REACTOR FOR REDUCING THE CONTENTS OF NITROGEN OXIDES AND SULPHUR OXIDES IN COMBUSTION GASES

BACKGROUND OF THE INVENTION

The present invention relates to a reactor for reducing the contents of nitrogen oxides and sulphur oxides in combustion gases, which reactor comprises a post-combustion chamber to be connected together with or after a combustion chamber.

A major problem in the combustion of liquid and solid fuels is the content of sulphur oxides and nitrogen oxides present in the flue gases. Thus, many attempts have been made to reduce this oxide content, both by flue gas cleaning and by catalytic treatment of the exhaust gases.

The invention is based on the insight that it is possible to reduce the content of nitrogen oxides and sulphur oxides to a considerable extent if it is ensured that suitable oxidation and temperature conditions prevail in the passageway between the combustion chamber and the chimney.

Swedish Patent 7804761-0 (SE-B-413,158) discloses an apparatus for the combustion of a mixture of gaseous or particulate, combustible material and combustion air. This apparatus is used for combusting various gaseous or particulate materials containing carbon or carbon compounds, in such a complete manner that the combustion gases emitted are practically free from soot, carbon monoxide and hydrocarbon residues. It is, however, not stated in the patent specification that the apparatus can be used for reducing the contents of nitrogen oxides and sulphur oxides in combustion gases.

U.S. Pat. No. 4,481,889 discloses a method for afterburning flue gases by conducting the impure gases through a burner in an afterburner in which the exhaust gases, by being positively mixed with a combustion gas, are subjected to complete combustion. In this process, combustible gases are thus supplied to bring about afterburning of the flue gases.

DE-A-3,014,590 discloses a pre-combustion chamber for an oil- or gas-fired, fan-supported burner. This pre-combustion chamber serves to shape the generated flame and to retard it before entering the combustion chamber. This apparatus thus serves as an intermediary between the burner and the combustion chamber, whereas not as a reactor for reducing the contents of nitrogen oxides and sulphur oxides in combustion gases.

SUMMARY OF THE INVENTION

A reactor is provided for reducing the contents of nitrogen oxides and sulphur oxides in combustion gases. The reactor is in the form of a post-combustion chamber to be connected after a combustion chamber. The reactor has a casing including a generally cylindrical main part transforming at its top into a dome-shaped outlet part with an outlet opening. Around the casing of the reactor, there is provided a heat-insulated wall whose inner side has substantially the same shape as the casing and which is eccentrically disposed in relation to the casing. The casing of the reactor accommodates a partition which is conical and has its apex directed towards the outlet opening. A gap is formed between the shell and the partition. At the inlet end of the shell, an inlet funnel is provided at a certain distance from the inlet end so as to form a gap. A heat exchanger is provided for preheating secondary air supplied through a secondary air intake into the gap between the casing and the wall at a certain distance from the opening. At the bottom, the gap is connected to a collecting box and an outlet pipe.

BRIEF DESCRIPTION OF THE DRAWINGS

The invention will now be described in more detail hereinbelow with reference to the accompanying drawings illustrating two embodiments of the device according to the invention.

In the drawings

DETAILED DESCRIPTION

Figure 1:
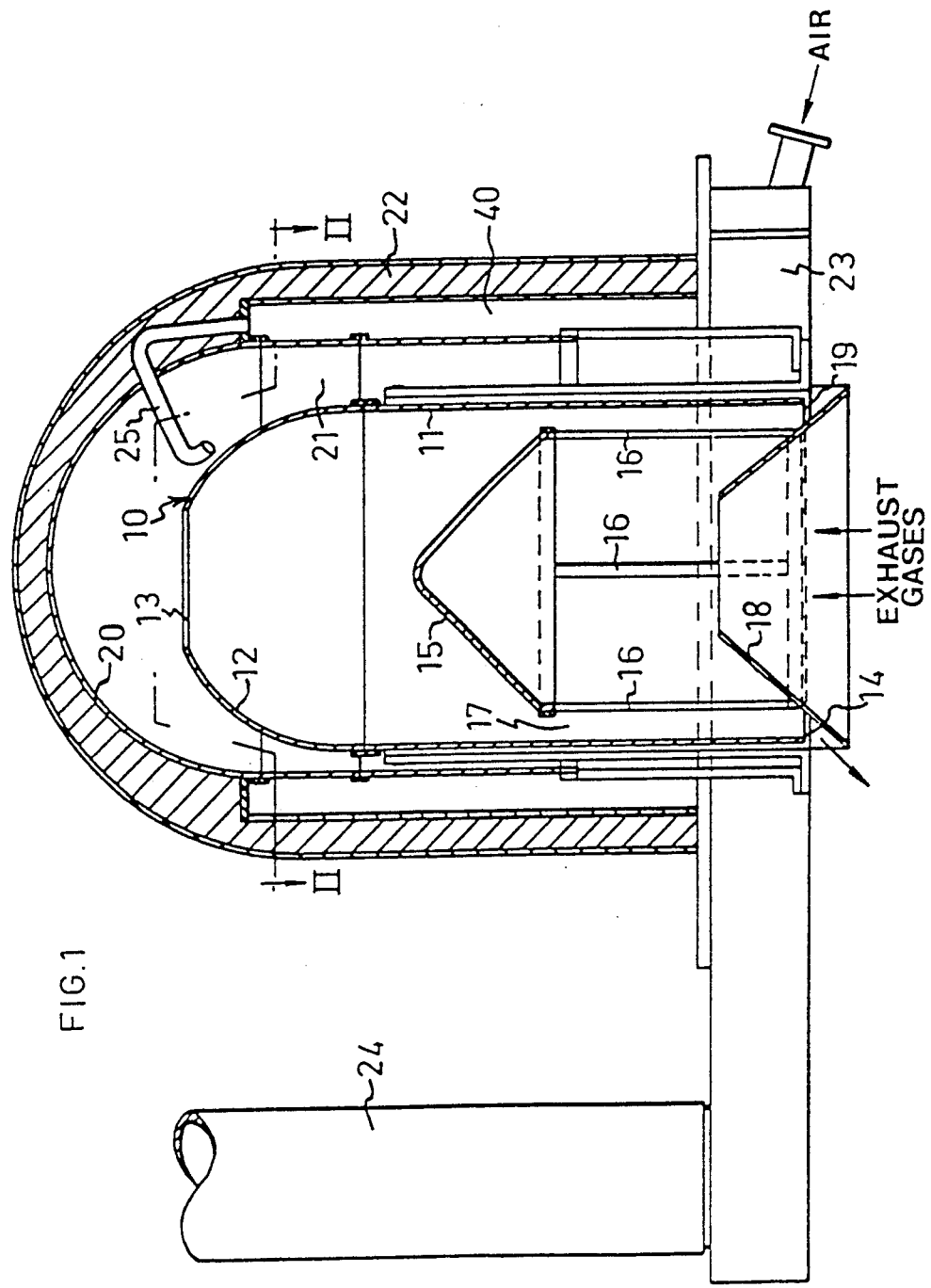
FIG. 1 is a vertical section schematically showing an embodiment of the reactor according to the invention.

The arrangement shown in FIG. 1 comprises a reactor for reducing the contents of nitrogen oxides and sulphur oxides in combustion gases. The reactor has a casing or wall 10 with a substantially vertical, generally cylindrical shell 11 and a dome-shaped outlet end 12 associated therewith. The dome-shaped outlet end has a central outlet opening 13. The opposite end of the shell 11 forms an inlet end 14. Inside the casing 10, there is provided a conical partition 15 which has its apex directed towards the outlet end 13 and which is mounted on support members 16 in a manner to define an annular gap 17 between the partition 15 and the casing 10. Instead of an annular gap, the connection between the upper and the lower part of the casing 10 may be in the form of at least two edge recesses distributed around the periphery of the partition, suitably as disclosed in SE-B-413,158 which is included by reference. At the bottom of the reactor, there is provided an inlet funnel 18 which leads the exhaust gases from a combustion chamber (not shown) into the reactor, so that the exhaust gases will be introduced at a suitably high velocity and directed towards the conical inner side of the partition 15. Around the casing 10, there is provided a further casing or wall 20 which has substantially the same shape as the casing 10 but larger dimensions so as to define a gap 21 between the casings 10 and 20. The casing 10 is eccentrically disposed in the casing 20. The casing 20 may be made of a heat-insulating material, but may also be surrounded by such a material. In the illustrated embodiment, an external heat-insulation 22 is used for the casing 20. The gap 21 between the two casings is connected at the bottom to an annular collecting box 23 connected to an outlet pipe 24, e.g. a chimney.

In the gap 21 between the two casings, there may be provided a heat exchanger (not shown in more detail) for preheating secondary air. In the embodiment according to FIG. 1, secondary air is however supplied through an annular space 40 formed between the casing 20 and the external heat-insulation 22. The preheated secondary air is fed through a secondary air intake 25 into the space between the two casings at some distance from the outlet opening 13.

Between the lower edge of the inlet end 14 of the inner casing 10 and the inlet funnel 18, there is defined an annular gap 19 for the separation of ash particles which have been separated in the post-combustion chamber 10 or formed during the combustion therein.

Figure 2:
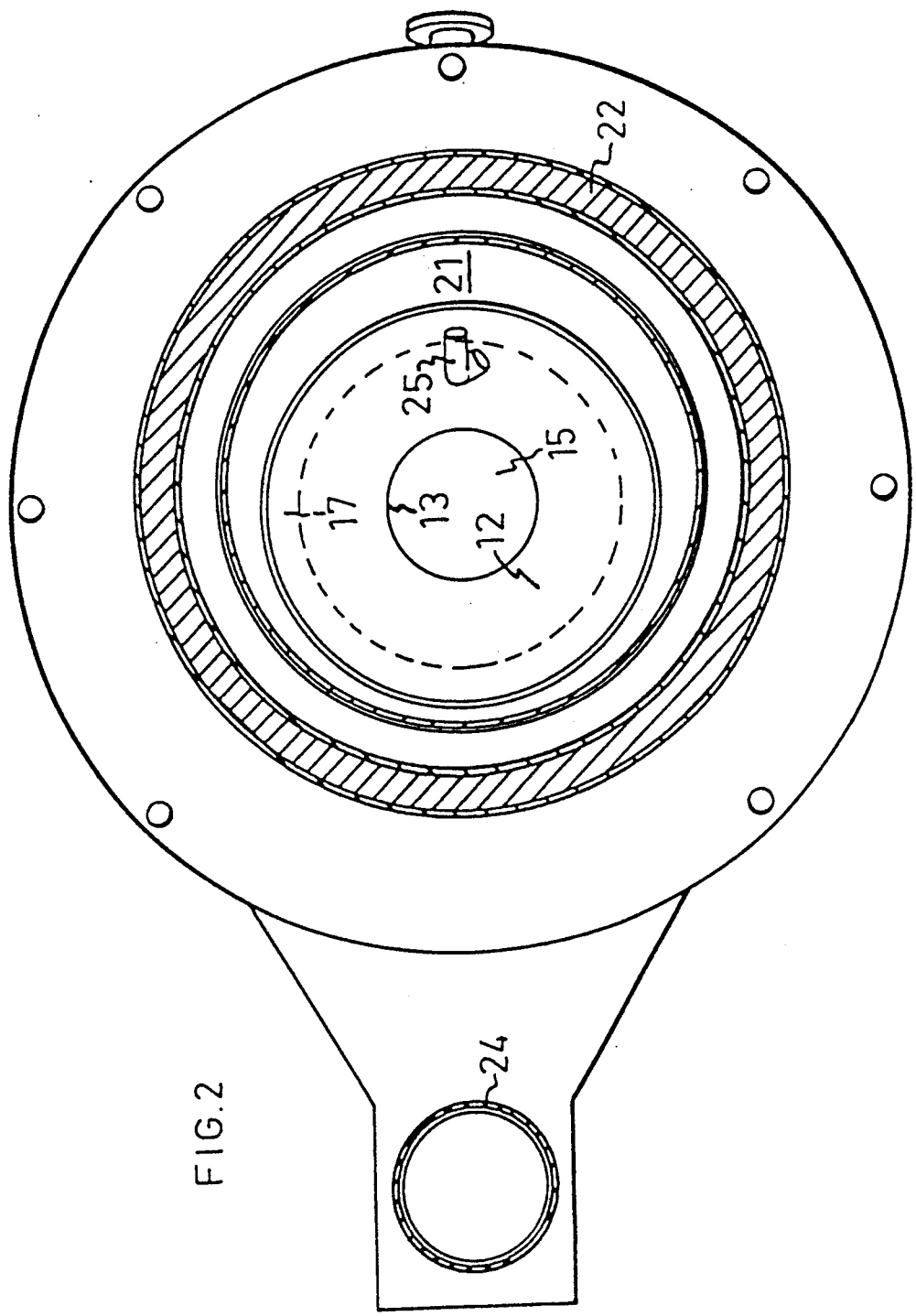
FIG. 2 is a section taken along the line II—II in FIG. 1.

When using the arrangement according to FIGS. 1 and 2, it is advantageous to have the exhaust gases from the combustion chamber arrive in the inlet funnel 18 at a maximum velocity of 2 m/s. By the conical shape of the inlet funnel, the gas velocity is increased and the gases are directed towards the inner side of the conical partition 15. As a result of the intense turbulence in the space below the conical partition, residual carbon monoxide will oxidise into carbon dioxide, and this oxidation will proceed in the space above the partition. From the outlet opening 13, the flue gases enter into the gap between the casings 10 and 20 where afterburning and treatment of sulphur oxides and nitrogen oxides is performed under the action of the preheated secondary air which is supplied through the secondary air intake 25 and preferably heated to a temperature of about 700° C. By the eccentric arrangement, intense mixing is achieved as well as compression alternating with expansion of the flue gases which are moving helically downwards to the collecting box 23 before passing out to the outlet pipe or chimney 24 at a temperature of about 900° C.

The principle of the inventive device is based on experiments with ideal turbulence for final oxidation of all hydrocarbon materials with a controlled low partial pressure in the gas phase to achieve a sufficient contact time with hot catalytic contact surfaces. The hot contact surfaces initially consist of the material in the partition 15. Behind this concave partition, there is thus a slower turbulence in a reducing atmosphere in order to obtain the necessary production of carbon monoxide for the process, e.g. for reducing the sulphur content in the combustion gases. In stoichiometric combustion and according to the following formulae, sulphur deposits by more than 90% as sulphur droplet which have been sublimated during the cooling. Since the post-combustion chamber is vertically mounted, the sublimated sulphur, together with other particles, will automatically pass to the ash bed through the gap between the inlet funnel 18 and the inlet end 14.

When the post-combustion chamber is used in large-scale plants, the formula $2CO + SO_2 \rightleftharpoons S + 2CO_2$ applies.

For plants with over-stoichiometric combustion, formulae $CO + O_2 \rightleftharpoons CO + CO_2$ and $SO_2 + CO + H_2O \rightleftharpoons H_2S + CO$ and $SO_2 + H_2S \rightleftharpoons S + H_2O$ apply.

If the gases entering the post-combustion chamber have a temperature of 900° C. and a flow velocity of at most 2 m/s, it is possible to obtain substantially soot- and particle-free exhaust gases when a catalysing surface exists on the conical partition 15 and on other contact surfaces affecting the combustion gases.

The different formulae relating to the combustion chamber appear from the following.

Figure 3:
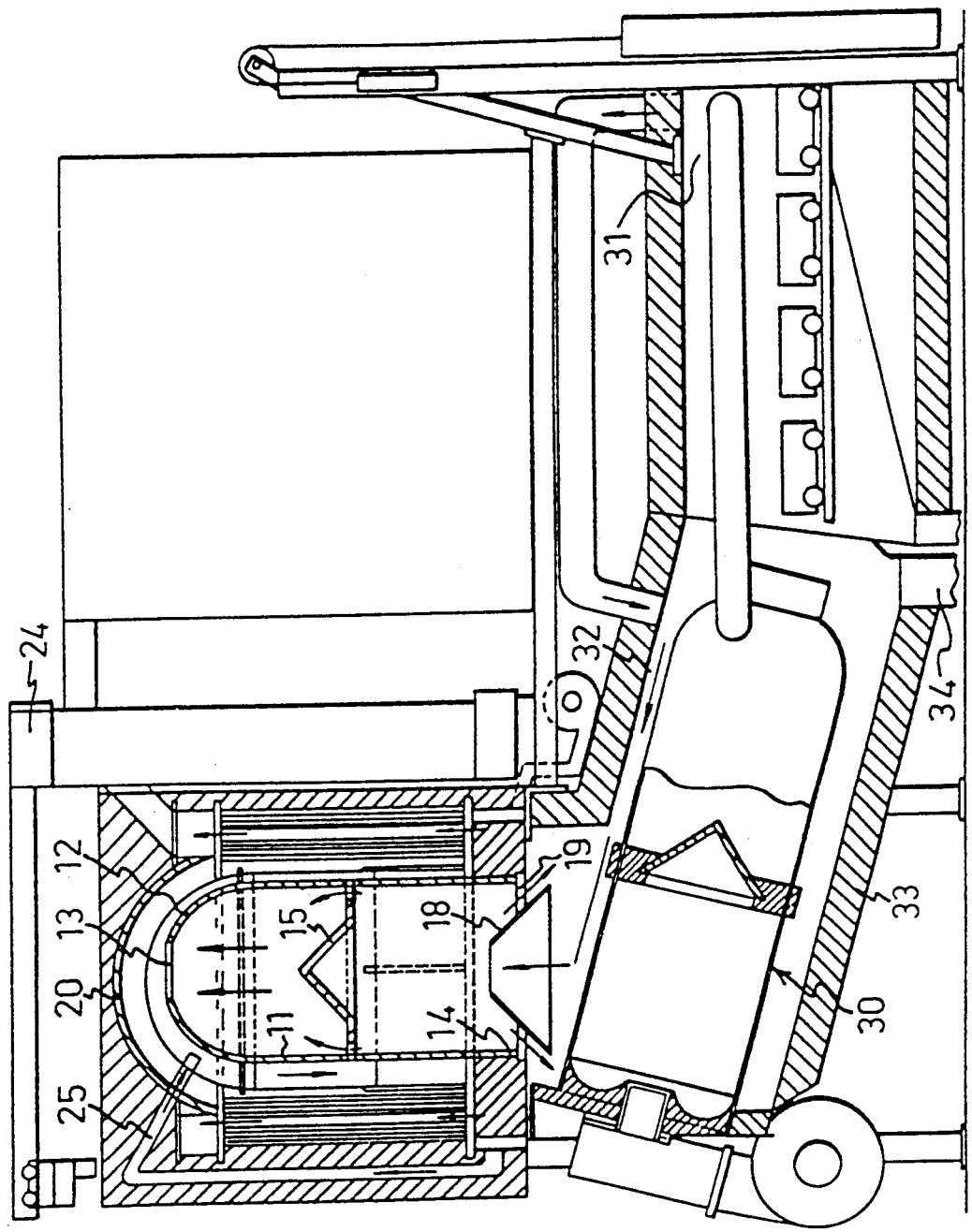
FIG. 3 is a vertical section schematically showing an incineration plant using another embodiment of a reactor according to the invention.

The device according to the invention as illustrated in FIG. 3 has substantially the same design as that in FIG. 1. The device in FIG. 3 is shown together with an incineration plant of the type disclosed in Swedish Patent 7804761-0 (SE-B-413,158). For a more detailed description of this arrangement, reference is thus made to said patent specification which is included by reference. The device in FIG. 3 is generally designated 30. After this incineration device, there is a further combustion chamber 31 in which noxious waste or solid fuels, for instance, can be combusted. From this combustion chamber or furnace 31, the combustion gases flow through a gap 32 up to the inlet funnel 18 and into the post-combustion chamber according to the invention. The gap 32 is formed between the incineration device 30 and a heat-insulated furnace wall 33. At the lower end of the space defined by the furnace wall 33, there is an ash outlet 34. Since the post-combustion chamber or reactor in FIG. 3 is essentially designed as in FIG. 1, equivalent parts have been given the same reference numerals. In the embodiment shown in FIG. 3, the partition 15 extends as far as the inner side of the cylindrical shell surface 11, and edge openings are provided which extend obliquely through the partition 15 adjacent the shell surface, such that the passage between the space below the partition and the space above it imparts a helical motion to the flue gases when entering the upper chamber above the partition 15.

Figure 4:
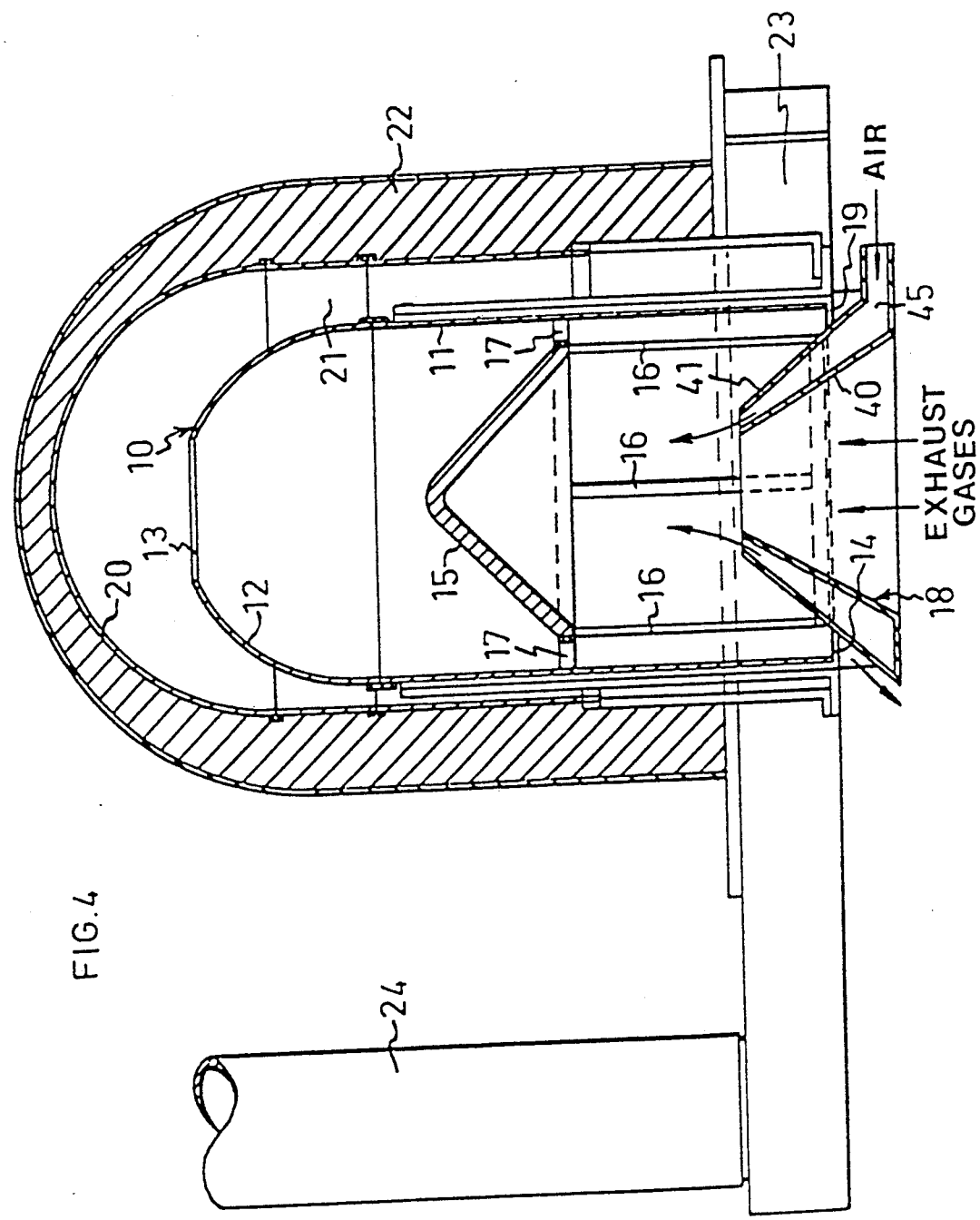
FIG. 4 shows yet another embodiment of a reactor according to the invention.

FIG. 4 shows a further embodiment of a reactor according to the present invention. Corresponding parts have been given the same reference numerals. The essential difference between the embodiments of FIG. 1 and FIG. 4 is the way of supplying secondary air through a secondary air intake 45. In this embodiment, the secondary air intake 45 consists of a gap between two conical walls 40, 41. This gap is fed with secondary air which may have been preheated in any suitable manner. The air is either blown through the gap 45 or sucked therethrough as a result of the ejector effect produced by the exhaust gases entering the reactor through the inlet funnel 18.

In the embodiment of FIG. 4, the conicial partition 15 has been designed in the manner shown in the above-mentioned SE-B-413,158, which means that there are provided at least two through passages 17 formed of edge openings distributed around the circumference of the partition and extending obliquely therethrough so as to impart a turbulent effect to the flue gases when passing between the inlet chamber and the outlet chamber.

The reactor according to the invention may advantageously be used also in incineration plants operating with a fluidised fuel bed.

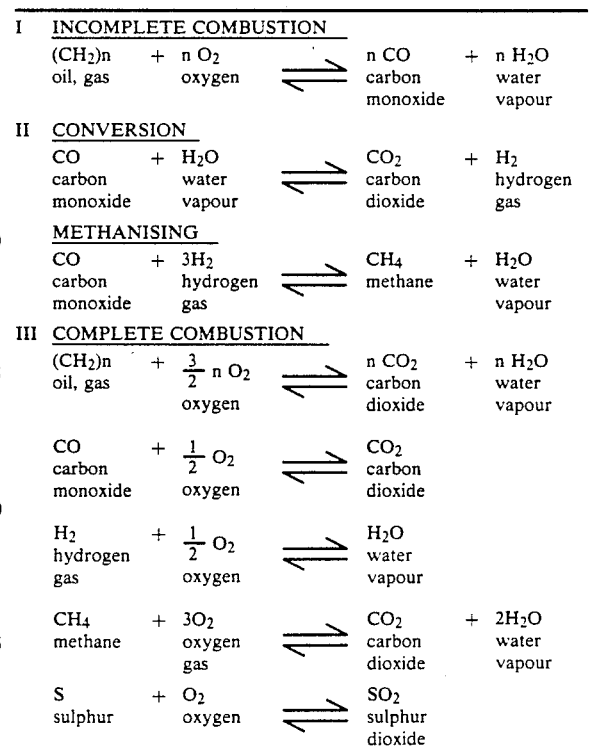

| I | INCOMPLETE COMBUSTION | | | | |
|---|---|---|---|---|---|
| | $(CH_2)n$ oil, gas | + | $nO_2$ oxygen | $\rightleftharpoons$ | $nCO$ carbon monoxide | + $nH_2O$ water vapour |
| II | CONVERSION | | | | |
| | $CO$ carbon monoxide | + | $H_2O$ water vapour | $\rightleftharpoons$ | $CO_2$ carbon dioxide | + $H_2$ hydrogen gas |
| | METHANISING | | | | |
| | $CO$ carbon monoxide | + | $3H_2$ hydrogen gas | $\rightleftharpoons$ | $CH_4$ methane | + $H_2O$ water vapour |
| III | COMPLETE COMBUSTION | | | | |
| | $(CH_2)n$ oil, gas | + | $\frac{3}{2}nO_2$ oxygen | $\rightleftharpoons$ | $nCO_2$ carbon dioxide | + $nH_2O$ water vapour |
| | $CO$ carbon monoxide | + | $\frac{1}{2}O_2$ oxygen | $\rightleftharpoons$ | $CO_2$ carbon dioxide | |
| | $H_2$ hydrogen gas | + | $\frac{1}{2}O_2$ oxygen | $\rightleftharpoons$ | $H_2O$ water vapour | |
| | $CH_4$ methane | + | $3O_2$ oxygen gas | $\rightleftharpoons$ | $CO_2$ carbon dioxide | + $2H_2O$ water vapour |
| | $S$ sulphur | + | $O_2$ oxygen | $\rightleftharpoons$ | $SO_2$ sulphur dioxide | |

$$2\,CO + SO_2 \rightleftharpoons S + 2\,CO_2$$

Alternative reaction with excess of $O_2$ and $H_2O$:

$$C + O_2 \rightleftharpoons CO + CO_2$$

$$SO_2 + CO + H_2O \rightleftharpoons H_2S + CO_2$$

$$SO_2 + H_2S \rightleftharpoons S + H_2O$$

I claim:

1. A reactor for reducing nitrogen oxides and sulphur oxides present in a combustion gas outlet stream from a combustion chamber, comprising:
   a casing comprising a vertically oriented, generally cylindrical shell having a longitudinal axis, a downwardly opening inlet end arranged to receive said combustion chamber combustion gas outlet stream and a generally dome-shaped outlet end axially opposite to said inlet end, said outlet end having radially centrally located thereon an outlet opening;
   a partition wall disposed within said casing at a location intermediate said inlet end and said outlet opening and dividing said casing into an inlet chamber adjacent said inlet end, and an outlet chamber adjacent said outlet end; said partition wall being generally transversally extending within said casing, so as to have a center disposed generally radially centrally of said generally cylindrical shell, and an outer perimeter disposed near an internal peripheral sidewall surface of said generally cylindrical shell;
   means defining at least one opening from said inlet chamber into said outlet chamber adjacent said sidewall surface of said generally cylindrical shell and remotely of said center of said partition wall;
   means providing a heat-insulating wall externally spaced from and enclosing said casing, thereby defining a space annularly between said wall means and said cylindrical shell and terminally between said wall means and said outlet end;
   means defining a secondary air supply conduit means having an outlet into one of:
   said space, at a location spaced from said outlet opening; and
   said inlet chamber;
   an outlet pipe; means communicating said space, adjacent said inlet end of said casing, with said outlet pipe;
   a frusto-conically tapering inlet funnel projecting through said inlet end, into said inlet chamber of said casing, said inlet funnel having a larger diameter inlet end disposed axially before said inlet end of said shell and an outlet end disposed within said inlet chamber, under said partition wall, whereby said combustion gas outlet stream, in flowing through said inlet funnel into said inlet chamber will be progressively reduced in transverse cross-sectional area;
   said inlet funnel, where axially passing said inlet end of said shell, being located generally radially centrally of said casing and being smaller in diameter than said inlet end of said shell, thereby defining an open annular gap for egress of ash particles from within said casing.

2. The reactor of claim 1, wherein:
   said at least one opening from said inlet chamber into said outlet chamber is constituted by a plurality of openings formed obliquely through a perimetrically outer portion of said partition wall in such a sense as to impart a swirling motion about said longitudinal axis to gas flowing from said inlet chamber into said outlet chamber through said openings.

3. The reactor of claim 1, wherein:
   at least one of said shell, said outlet end of said casing and said partition wall contains a material having an ability to catalyze oxygen of carbon and carbon compounds.

4. The reactor of claim 1, further including:
   means effective upstream of said secondary air outlet, for preheating secondary air flowing through said secondary air supply conduit means.

5. The reactor of claim 1, wherein:
   said secondary air supply conduit means has an inlet opening disposed adjacent said inlet end of said inlet funnel, said outlet of said secondary air supply conduit being disposed adjacent said outlet end of said inlet funnel; said secondary air supply conduit, between said inlet end and outlet of said secondary air supply conduit extending externally upon said inlet funnel.

* * * * *